April 28, 1925.
J. O. JOHNSON
LUBRICATOR
Filed Aug. 6, 1923
1,536,010
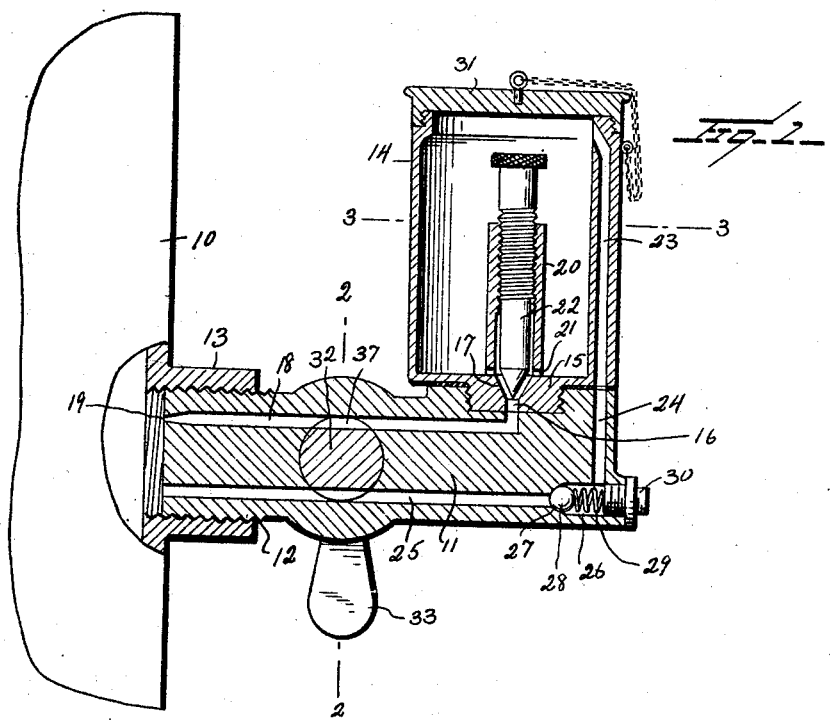
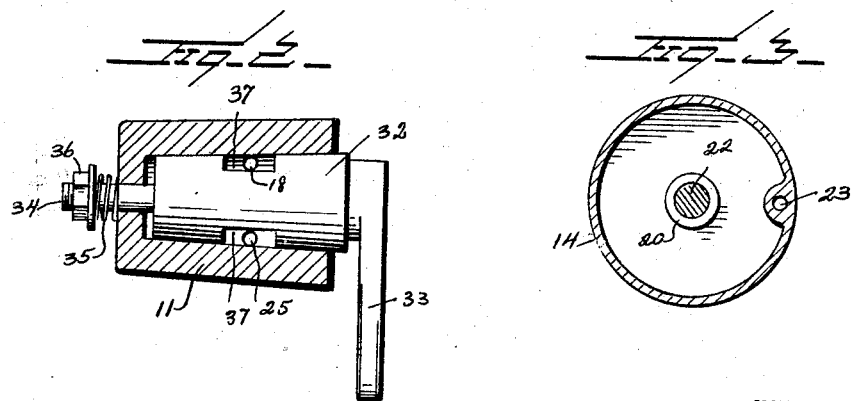
INVENTOR.
J. O. Johnson
BY Watson E. Coleman
ATTORNEY.

Patented Apr. 28, 1925.

1,536,010

UNITED STATES PATENT OFFICE.

JOHN O. JOHNSON, OF NAKINA, ONTARIO, CANADA.

LUBRICATOR.

Application filed August 6, 1923. Serial No. 656,118.

*To all whom it may concern:*

Be it known that I, JOHN O. JOHNSON, a subject of the King of Sweden, residing in Nakina, Province of Ontario, in the Dominion of Canada, have invented certain new and useful Improvements in Lubricators, of which the following is a specification, reference being had to the accompanying drawings.

This invention relates to lubricators, and particularly to means for lubricating the air inlet end of an air compressor such as is used on locomotives.

The general object of the invention is to provide a lubricator of this character in which the lubricant will be forced into the compressing cylinder upon each stroke of the piston thereof and in which some of the compressed air within the compressing cylinder will be forced into the lubricant containing chamber and force lubricant out therefrom into the cylinder.

A further object is to provide a construction of this character which is connected to the compressing cylinder midway between its ends, that is midway of the stroke of the piston thereof, so that upon the inward stroke of the piston the air compressed behind the piston will be forced into the lubricant container to thereby compress the air in there and then as the piston passes the outlet from the lubricator the compressed air within the chamber will force the lubricant out into the inlet end of the cylinder and this lubricant will be taken up by the air and will thus be distributed within the cylinder.

A still further object is to provide a construction of this character wherein the lubricant chamber may be readily cut off from the compressing cylinder whenever desired and wherein there is an adjustable valve controlling the flow of lubricant to the cylinder.

Other objects will appear in the course of the following description.

My invention is illustrated in the accompanying drawings, wherein:—

Figure 1 is a sectional view through my improved lubricator showing it applied to the cylinder of an air compressor;

Figure 2 is a section on the line 2—2 of Figure 1;

Figure 3 is a section on the line 3—3 of Figure 1;

Referring to these drawings, 10 designates the air compressing cylinder of a locomotive engine. Extending from the air compressing cylinder is a base 11 which is exteriorly screw-threaded, as at 12, to engage an outwardly extending nipple 13 on the compressor and at its outer end this base has a horizontal face upon which the oil reservoir or container 14 is mounted. This container at its lower end has a screw-threaded hub 15 which engages in an interiorly screw-threaded recess in the base 11. This hub 15 has a port 16 which upwardly flares to form a valve seat 17. The base 11 is formed with a longitudinally extending passage 18 which at its outer end is upwardly extended to align with the port 16 when the lubricant container is in place. The outer end of this passage 18 is contracted, as at 19.

Extending upward from the bottom of the container or reservoir 14 is a tubular member 20 which is interiorly screw-threaded and which at its lower end is provided with two or more apertures 21 which are coincident with the lower end of the oil container or reservoir. Having engagement with the interior screw-threads of the member 20 is a needle valve 22, the lower end of which is tapered and adapted to fit tightly against the seat 17 when the needle valve is screwed down. This needle valve controls the flow of oil or other lubricant from the reservoir.

One wall of the container 14 is thickened and formed with a vertically extending passage 23, this passage at its upper end being inwardly curved and opening into the upper end of the container 14. The lower end of the passage 23, when the container is mounted upon the base, registers with a passage 24 which forms a continuation of the passage 23 and intersects a longitudinally extending passage 25 which extends longitudinally through the base and opens at the end thereof remote from the passage 24.

At the intersection of the passages 24 and 25, the passage 25 is enlarged to form a valve chamber 26 having a seat 27, and disposed within this valve chamber and bearing against this seat is a ball 28 which is urged to its closed position by a spring 29, and a plug 30 is screwed into the end of the base 11 to hold the spring and ball 28 in place and permit the insertion of the spring and ball. A cover 31 is adapted to be screwed upon the upper end of the container 14, this cover being held from loss by means of a chain. By removing this cover, the chamber 14 may be filled with oil.

Intersecting the base 11 is a rotatable valve or cock 32 which is tapered and fits, of course, within the tapered bore. One end of this valve 32 is provided with a handle 33 and the opposite end is reduced to form a spindle 34 which extends through the end wall of the valve chamber. The spindle 34 extends through the end wall, as before remarked, and surrounding the spindle and bearing against this end wall is a coiled spring 35 and engaging the spindle is a nut 36 against which the outer end of the coiled spring bears. This coiled spring, of course, will act to urge the valve 32 in a direction to keep it tight upon its seat even if the nut 36 should become loosened. The approximately cylindrical valve 32 is formed with two oppositely disposed, tangentially extending cut away portions 37 constituting ducts, and the valve 32 is of such diameter that when the valve is turned to the position shown in Figure 1, these ducts 37 will align with and form part of the passages 18 and 25 so that the flow of air and oil will not be impeded. When the valve is turned at right angles to the position shown in Figure 1, however, it will cut off both the flow of air and of oil. This is turned to this position in order to permit the cover 31 to be removed and the reservoir 14 filled with oil or other lubricant.

The operation of this mechanism is as follows:

The lubricator is to be screwed into the cylinder wall of the compression cylinder 10 about half way between its upper and lower heads. Under these circumstances when the compressing piston makes its upward stroke, compressed air will pass through passage 25, open valve 28 against the action of spring 29, and pass on into the top of the oil reservoir to thus create a pressure on the oil. Air will also, of course, pass through the port 19 and into the passage 18 and so up into the port 16 but there will be a relatively small quantity of air thus delivered due to the restricted opening 19. This air, inasmuch as it will be heated by compression, will tend to keep the oil warm. When the piston has completed the first half of its upward stroke and has passed the port 19, there is only atmospheric pressure beneath the piston. The ball 28 will then be urged to its seat and cut off the escape of air through passage 23 and the pressure that has accumulated on top of the oil in the reservoir will force the oil past the regulating valve 22 into port 16 and thence to the cylinder and the inrush of air through the receiving valves of the compressor will tend to distribute the oil within the cylinder. Should there be a slight leak past the piston of the compressor into the lower ends of the cylinder, the pressure accumulated above the oil in the lubricator chamber 14 will overcome the pressure in the cylinder and the lubricator will continue to operate. The effect will be the same on the return stroke of the compressor piston.

While I have illustrated a construction which I believe to be particularly effective, which is relatively compact, cheap to make and has been found to operate properly, I do not wish to be limited to the exact details of this construction as it is obvious that many changes might be made therein without departing from the spirit of the invention as defined in the appended claims.

My lubricator will work satisfactorily if applied to any cylinder performing duties similar to the cylinder of a locomotive air compressor, where the air cylinder is exposed to pressure first on one side of the piston and then on the other, so that when the piston is moving up the pressure is on top of the piston and increases until the piston has reached the end of its stroke, and when the piston is moving down the pressure is under the piston and increases as the piston is moving down until it reaches the end of its stroke, or where the lubricator is applied to the steam chest of a steam engine where the pressure is constant, the pressure will be nearly equalized at both top and bottom of the oil and the weight of the oil will allow it to feed properly. However, the principal idea of my invention is to provide a lubricator that will properly distribute the lubricant to all parts of the air cylinders of locomotive air compressors, and by admitting air to the cylinder at both the up and down stroke, this lubricator will fulfill its requirement, particularly inasmuch as a lubricator for locomotive air compressors should be of small size in order that it may be properly applied.

I am aware that there are several lubricators in use for air compressors of this type, some for hand oiling and also for automatic oiling, but as all the oilers known to me are attached to the top head of the cylinder, the cylinder receives oil in one direction, that is on the down stroke only, and if the piston rings are leaky, a pressure is built up on top the piston so great that the lubricator stops working. Other lubricators are attached to the cylinder through the medium of a long oil pipe which often becomes stopped up or clogged up and this is hard to take down and clean. With my lubricator, however, all passages are short and, therefore, cannot become clogged up so easily and even if they should clog the lubricator can be easily taken apart and cleaned.

I claim:—

1. The combination with an air compressing cylinder having a piston operating therein, of an oil reservoir having separate inlet and outlet passages, the outlet passage extending from the bottom of the oil reservoir into the cylinder and the inlet passage extending from the cylinder to the top of the oil reservoir, a check valve disposed in the last named passage permitting the inlet of air but preventing the outlet of air, an adjustable valve for controlling the outlet of oil through the outlet passage and disposed entirely within the oil reservoir, and a manually operable valve disposed between the lubricant reservoir and the cylinder and adapted to close off both of said passages or open both of said passages.

2. The combination with an air compressing cylinder having a piston of means for lubricating the same comprising a lubricant reservoir having a duct leading from the bottom thereof into the compressing cylinder at the middle thereof and having a second duct leading from the compressing cylinder at approximately the middle thereof into the upper end of the lubricant reservoir, an adjustable valve for controlling the passage of oil through the first named duct to the cylinder, a check valve preventing the return of air from the upper end of the oil reservoir into the cylinder but permitting the passage of air into said reservoir, and a manually operable valve adapted to close off both of said ducts or to open both of said ducts.

3. The combination with a compressing cylinder, of means for lubricating the same comprising a valve base extending out through the middle of the compressing cylinder, a lubricant reservoir mounted upon the outer end of said base and extending vertically upward therefrom and having an outlet port in its bottom, the base being formed with a longitudinally extending duct having a contracted end opening into the cylinder and at its opposite end registering with the port in the bottom of the reservoir, the side wall of the reservoir being formed with a longitudinally extending duct opening into the upper end of the reservoir, the base being formed with a second duct opening at one end into the interior of the compressing cylinder and at the other end registering with said last named duct, a check valve in the last mentioned duct permitting the flow of air into the upper end of the reservoir but preventing the outflow of air therefrom, and an adjustable valve supported within the reservoir and controlling the flow of oil through the port in the bottom thereof.

4. The combination with a compressing cylinder, of means for lubricating the same comprising a valve base extending out from the middle of the compressing cylinder, a lubricant reservoir mounted upon the outer end of said base and extending vertically upward therefrom and having an outlet port in its bottom, the base being formed with a longitudinally extending duct having a contracted end opening into the cylinder and at its opposite end registering with the port in the bottom of the reservoir, the side wall of the reservoir being formed with a longitudinally extending duct opening into the upper end of the reservoir, the base being formed with a second duct opening at one end into the interior of the compressing cylinder and at the other end registering with said last named duct, a check valve in the last mentioned duct permitting the flow of air into the upper end of the reservoir but preventing the outflow of air therefrom, an adjustable valve supported within the reservoir and controlling the flow of oil through the port in the bottom thereof, means for cutting off or allowing the flow of air and oil through the passages formed in said base and comprising a tapered valve intersecting said passages, the valve having elongated recesses upon opposite faces adapted to register with said passages when the valve is turned into one position, and resilient means for urging said valve to its seat.

5. As an article of manufacture, a lubricator of the character described comprising a base screw-threaded at one end for insertion in the article to be lubricated, the opposite end of the base having an interiorly screw-threaded recess on one face, a passage extending longitudinally through the base and opening upon said recess, a second passage extending longitudinally through the base and enlarged at its outer end and then extending upwardly to the face of the base exterior to said recess, a valve extending through the base and intersecting said passages and adapted to be shifted in one direction to close said passages or in the other direction to open said passages, a check valve mounted in the enlarged portion of the second named passage and preventing return flow through said passage, a lubricant reservoir having an exteriorly screw-threaded hub engaged in said recess, the hub being formed with a seat and a port leading therefrom and adapted to register with the first named passage in the base, a tubular supporting member extending upward from the base of the reservoir and interiorly screw-threaded and having openings at its lower end, a needle valve engaging the threading in said member and controlling passage through said port, one wall of the reservoir having a vertically extending port opening into the top of the reservoir and with which the upwardly extending portion of the second named passage is adapted to register, and a detachable cover for the reservoir.

In testimony whereof I hereunto affix my signature.

JOHN O. JOHNSON.